United States Patent
Hirama et al.

(10) Patent No.: US 12,529,206 B2
(45) Date of Patent: Jan. 20, 2026

(54) WORK MACHINE AND METHOD FOR CONTROLLING WORK MACHINE

(71) Applicant: KOMATSU LTD., Tokyo (JP)

(72) Inventors: Takahiro Hirama, Tokyo (JP); Keiichi Hayashi, Tokyo (JP)

(73) Assignee: KOMATSU LTD., Tokyo (JP)

( * ) Notice: Subject to any disclaimer, the term of this patent is extended or adjusted under 35 U.S.C. 154(b) by 729 days.

(21) Appl. No.: 17/912,270

(22) PCT Filed: Jun. 18, 2021

(86) PCT No.: PCT/JP2021/023146
§ 371 (c)(1),
(2) Date: Sep. 16, 2022

(87) PCT Pub. No.: WO2022/009647
PCT Pub. Date: Jan. 13, 2022

(65) Prior Publication Data
US 2023/0145883 A1     May 11, 2023

(30) Foreign Application Priority Data
Jul. 10, 2020   (JP) .................................. 2020-118864

(51) Int. Cl.
*E02F 9/08*     (2006.01)
*E02F 9/22*     (2006.01)

(52) U.S. Cl.
CPC ............ *E02F 9/0841* (2013.01); *E02F 9/225* (2013.01)

(58) Field of Classification Search
CPC ................................ E02F 9/0841; E02F 9/225
(Continued)

(56) References Cited

U.S. PATENT DOCUMENTS 10,215,119 B2   2/2019   Mei et al.
10,619,330 B2   4/2020   Becker et al.
(Continued)

FOREIGN PATENT DOCUMENTS

CN   1940354 A    4/2007
CN   103958943 A  7/2014
(Continued)

OTHER PUBLICATIONS

The Office Action for the corresponding Chinese application No. 202180032614.6, issued on Jan. 18, 2024.
(Continued)

*Primary Examiner* — Valentin Neacsu
*Assistant Examiner* — Mohamed M Medani
(74) *Attorney, Agent, or Firm* — GLOBAL IP COUNSELORS, LLP (57) ABSTRACT

A second frame is turnably connected to a first frame. A steering cylinder is connected to the second frame and the first frame. The steering cylinder causes the second frame to turn with respect to the first frame. A hydraulic pump supplies hydraulic fluid to the steering cylinder. An engine drives the hydraulic pump. A steering operating member is operable by an operator. A steering operation sensor outputs a steering command signal corresponding to an operation of the steering operating member. A controller controls a flow rate of the hydraulic fluid supplied from the hydraulic pump to the steering cylinder by controlling a rotation speed of the engine in accordance with the steering command signal.

16 Claims, 6 Drawing Sheets

(58) Field of Classification Search
USPC .......................................................... 180/418
See application file for complete search history.

(56) References Cited

U.S. PATENT DOCUMENTS

| | | | |
|---|---|---|---|
| 2001/0008068 A1 | 7/2001 | Ikari et al. | |
| 2006/0137337 A1 | 6/2006 | Kim | |
| 2007/0078041 A1 | 4/2007 | Nishi et al. | |
| 2012/0304635 A1* | 12/2012 | Ooi | F02D 31/007 60/431 |
| 2013/0041561 A1 | 2/2013 | Asami et al. | |
| 2014/0144129 A1* | 5/2014 | Shirao | F15B 15/20 60/459 |
| 2016/0097186 A1* | 4/2016 | Yamada | B60K 6/445 180/65.265 |
| 2016/0121900 A1 | 5/2016 | Yoshizawa et al. | |
| 2016/0319848 A1 | 11/2016 | Tanaka et al. | |
| 2017/0145659 A1* | 5/2017 | Yoshizawa | E02F 9/2296 |
| 2017/0274930 A1 | 9/2017 | Zhang et al. | |
| 2019/0084615 A1* | 3/2019 | Takenaka | E02F 9/2087 |
| 2020/0172158 A1 | 6/2020 | Tanaka et al. | |
| 2021/0047801 A1 | 2/2021 | Tanaka et al. | |
| 2021/0131070 A1 | 5/2021 | Oasa | |

FOREIGN PATENT DOCUMENTS

| | | | |
|---|---|---|---|
| CN | 105283649 A | | 1/2016 |
| CN | 105848989 A | | 8/2016 |
| CN | 108698636 A | | 10/2018 |
| CN | 110199104 A | | 9/2019 |
| JP | 2000-27765 A | | 1/2000 |
| JP | 2002-39111 A | | 2/2002 |
| JP | 2003300472 A | * | 10/2003 |
| JP | 2020-51194 A | | 4/2020 |
| KR | 10-2011-0019336 A | | 2/2011 |

OTHER PUBLICATIONS

The International Search Report for the corresponding international application No. PCT/JP2021/023146, issued on Aug. 31, 2021.
The extended European search report for the corresponding European application No. 21838757.9 dated Apr. 15, 2024.

* cited by examiner

WORK MACHINE AND METHOD FOR CONTROLLING WORK MACHINE

CROSS-REFERENCE TO RELATED APPLICATIONS

This application is a U.S. National stage application of International Application No. PCT/JP2021/023146, filed on Jun. 18, 2021. This U.S. National stage application claims priority under 35 U.S.C. § 119(a) to Japanese Patent Application No. 2020-118864, filed in Japan on Jul. 10, 2020, the entire contents of which are hereby incorporated herein by reference.

TECHNICAL FIELD

The present invention relates to a work machine and a method for controlling the work machine.

BACKGROUND ART

Among work machines, a so-called articulated vehicle is known in which a front frame and a rear frame are turnably connected to each other as described in U.S. Ser. No. 10/215,119. Such a work machine includes a steering cylinder, a hydraulic pump, and an engine. The steering cylinder is connected to the front frame and the rear frame. The hydraulic pump is driven by the engine to discharge hydraulic fluid. Hydraulic fluid discharged from the hydraulic pump is supplied to the steering cylinder. The steering cylinder extends and contracts thereby turning the front frame with respect to the rear frame. Consequently, the front frame bends with respect to the rear frame and the work machine turns.

SUMMARY

In the above-mentioned work machine of the prior art, the operator operates an accelerator pedal whereby the rotation speed of the engine is controlled. However, the flow rate of the hydraulic fluid supplied from the hydraulic pump to the steering cylinder changes in accordance with the rotation speed of the engine. The flow rate of hydraulic fluid supplied to the steering cylinder signifies the volume of hydraulic fluid supplied to the steering cylinder per unit of time.

When the rotation speed of the engine is low, the flow rate of hydraulic fluid supplied to the steering cylinder decreases. As a result, the displacement of the hydraulic pump is designed to take into consideration a situation when the rotation speed of the engine is lowest in order to assure the minimum necessary flow rate of hydraulic fluid for the work machine to turn. Therefore, the size of the hydraulic pump is set to be on the large side with room for margin. However, in this case, when the rotation speed of the engine is high, the hydraulic pump may discharge hydraulic fluid at a flow rate that is greater than necessary. As a result, there is a problem that fuel consumption deteriorates.

In addition, when the engine rotation speed is low, there is a problem that the followability of the bending motion of the work machine with respect to the steering operation by the operator is poor. For example, when the operator has quickly performed a steering operation, the phenomenon that the bending motion is slow is reflected in the operational feel of the operator because the discharge flow rate of the hydraulic pump is insufficient.

An object of the present invention is to improve the followability of a bending motion of a work machine with respect to a steering operation.

A work machine according to a first aspect includes a first frame, a second frame, a steering cylinder, a hydraulic pump, an engine, a steering operating member, a steering operation sensor, and a controller. The second frame is turnably connected to the first frame. The steering cylinder is connected to the second frame and the first frame. The steering cylinder causes the second frame to turn with respect to the first frame. The hydraulic pump supplies hydraulic fluid to the steering cylinder. The engine drives the hydraulic pump. The steering operating member is operable by an operator. The steering operation sensor outputs a steering command signal corresponding to the operation of the steering operating member. The controller controls the flow rate of hydraulic fluid supplied from the hydraulic pump to the steering cylinder by controlling the rotation speed of the engine in accordance with the steering command signal.

A method according to a second aspect is a method for controlling a work machine, the work machine including a first frame, a second frame, a steering cylinder, a hydraulic pump, and an engine. The second frame is turnably connected to the first frame. The steering cylinder is connected to the second frame and the first frame. The steering cylinder causes the second frame to turn with respect to the first frame. The hydraulic pump supplies hydraulic fluid to the steering cylinder. The engine drives the hydraulic pump. The method according to the present aspect includes the following processes. A first process is acquiring a steering command signal corresponding to a steering operating member that is operable by an operator. A second process is controlling the flow rate of hydraulic fluid supplied from the hydraulic pump to the steering cylinder by controlling the rotation speed of the engine in accordance with the steering command signal.

According to the present disclosure, the rotation speed of the engine is controlled in response to a steering command signal corresponding to the operation of the steering operating member. As a result, the flow rate of hydraulic fluid supplied from the hydraulic pump to the steering cylinder is controlled in accordance with the operation of the steering operating member. Consequently, the followability of a bending motion of the work machine with respect to a steering operation can be improved.

DESCRIPTION OF EMBODIMENTS

Figure 1:
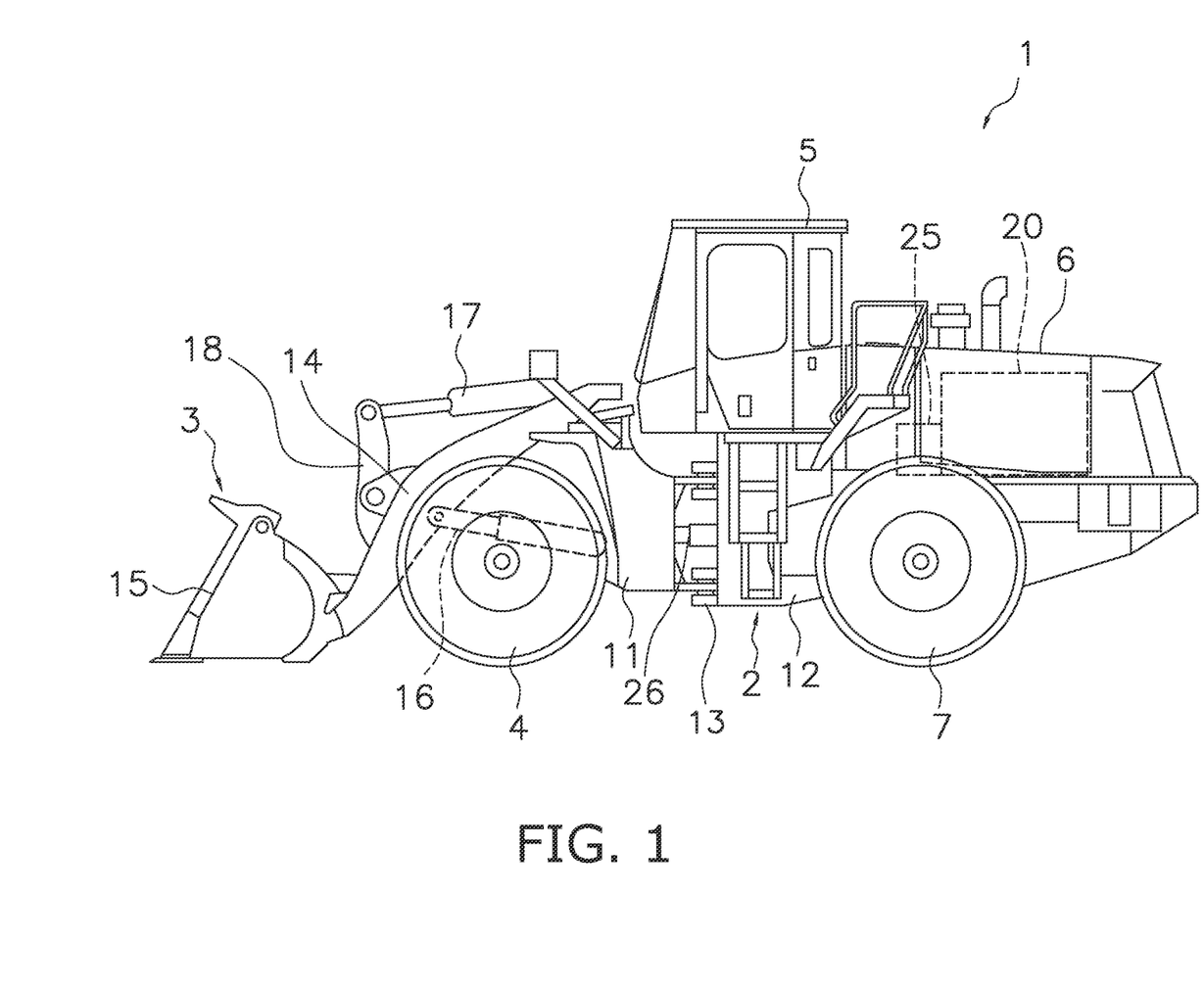
FIG. 1 is a side view of a work machine according to an embodiment.

The following is a description of a work machine according to an embodiment with reference to the drawings. FIG. 1 is a side view of a work machine 1 according to the embodiment. The work machine 1 according to the present embodiment is a wheel loader. The wheel loader 1 includes a vehicle body frame 2, a work implement 3, a pair of front tires 4, a cab 5, an engine compartment 6, and a pair of rear tires 7. In the following explanations, "front," "rear," "right," "left," "up," and "down" indicate directions relative to a state of looking forward from an operator's seat within the cab 5.

The vehicle body frame 2 includes a front frame 11, a rear frame 12, and a pivot joint 13. The front frame 11 is disposed in front of the rear frame 12. The pivot joint 13 is disposed in the center in the left-right direction of the work machine 1. The pivot joint 13 turnably couples the front frame 11 and the rear frame 12. The pair of front tires 4 are attached to the front frame 11. The pair of rear tires 7 are attached to the rear frame 12.

The work implement 3 includes a boom 14, a bucket 15, a lift cylinder 16, and a bucket cylinder 17. The boom 14 is mounted to the front frame 11. The bucket 15 is attached to the tip of the boom 14.

The lift cylinder 16 and the bucket cylinder 17 are hydraulic cylinders. One end of the lift cylinder 16 is attached to the front frame 11 and the other end of the lift cylinder 16 is attached to the boom 14. The boom 14 swings up and down due to the extension and contraction of the lift cylinder 16. One end of the bucket cylinder 17 is attached to the front frame 11 and the other end of the bucket cylinder 17 is attached to the bucket 15 via a bell crank 18. The bucket 15 swings up and down due to the extension and contraction of the bucket cylinder 17.

The cab 5 is disposed on the rear frame 12. The engine compartment 6 is disposed behind the cab 5. The engine compartment 6 is disposed on the rear frame 12.

Figure 2:
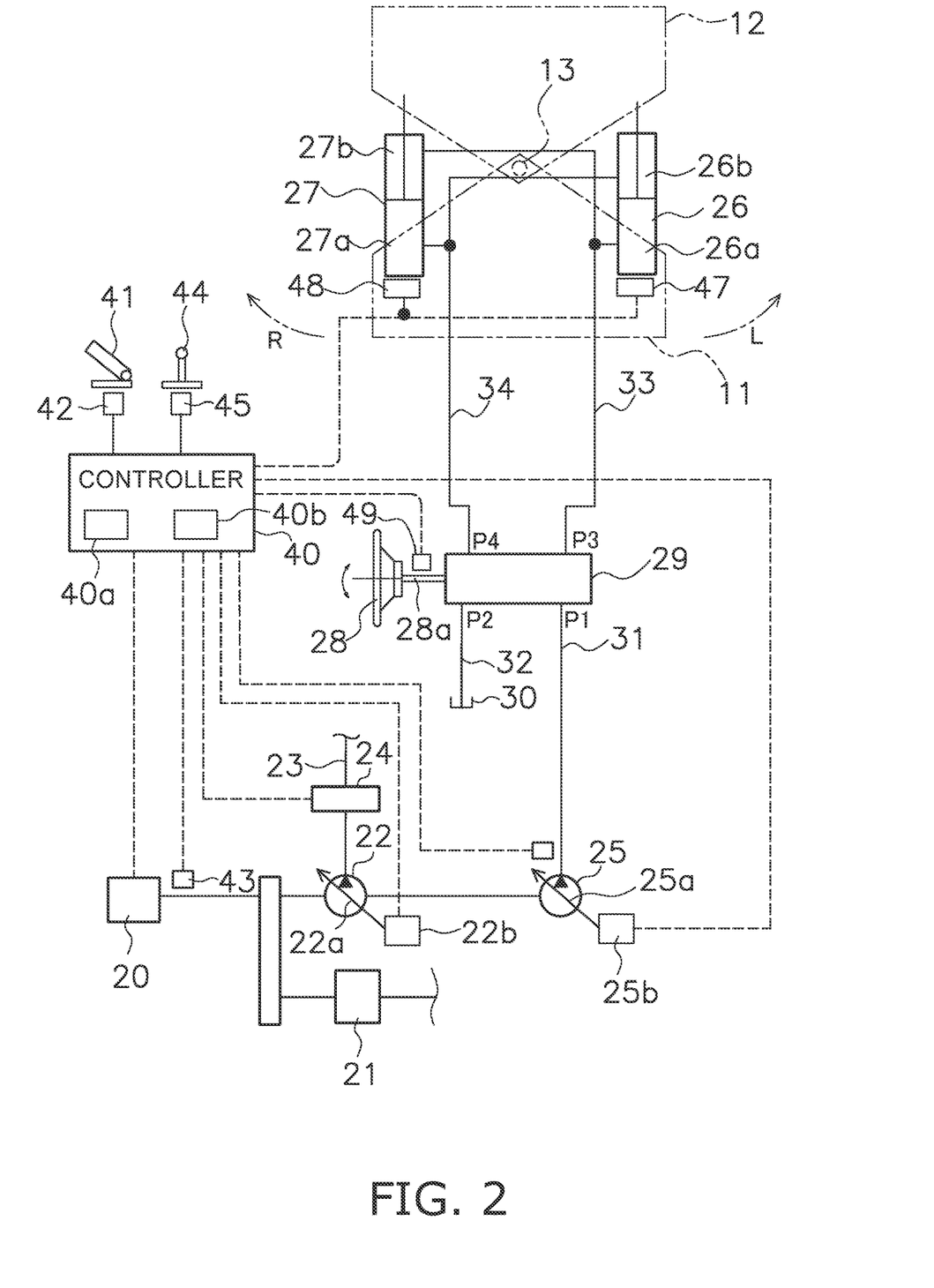
FIG. 2 is a schematic view of a control system of the work machine.

FIG. 2 is a schematic view of a control system of the work machine 1. As illustrated in FIG. 2, the work machine 1 includes an engine 20, a transmission 21, and a work implement pump 22. The engine 20 is an internal combustion engine. The engine 20 is disposed in the engine compartment 6.

The transmission 21 is connected to the engine 20. The transmission 21 causes the tires 4 and 7 to rotate with the driving power of the engine 20. The transmission 21 may be, for example, a mechanical transmission including a plurality of speed change gears. Alternatively, the transmission 21 may be another type of transmission, such as a hydrostatic transmission (HST), a hydro-mechanical type transmission (HMT), or an electro-mechanical type transmission (EMT).

The work implement pump 22 is connected to the engine 20. The work implement pump 22 is driven by the engine 20 and discharges hydraulic fluid. The work implement pump 22 is a variable displacement hydraulic pump. The work implement pump 22 has a swash plate 22a. The displacement of the work implement pump 22 is changed by changing the angle of the swash plate 22a. The displacement of the pump is the maximum discharge displacement of hydraulic fluid per one rotation of the pump. The work implement pump 22 is connected to a displacement control device 22b. The displacement control device 22b changes the displacement of the work implement pump 22 by changing the angle of the swash plate 22a.

The work implement pump 22 is connected to the lift cylinder 16 and the bucket cylinder 17 via a hydraulic circuit 23. The hydraulic fluid discharged from the work implement pump 22 is supplied to the lift cylinder 16 and the bucket cylinder 17. Consequently, the work implement 3 moves. A control valve 24 is disposed in the hydraulic circuit 23. The control valve 24 controls the flow rate of hydraulic fluid supplied from the work implement pump 22 to the lift cylinder 16 and the bucket cylinder 17.

The work machine 1 includes a steering pump 25, steering cylinders 26 and 27, a steering operating member 28, and a steering valve 29. The steering pump 25 is a variable displacement hydraulic pump. The steering pump 25 is connected to the engine 20. The steering pump 25 is driven by the engine 20 and discharges hydraulic fluid.

The steering pump 25 has a swash plate 25a. The displacement of the steering pump 25 is changed by changing the angle of the swash plate 25a. The steering pump 25 is connected to a displacement control device 25b. The displacement control device 25b changes the displacement of the steering pump 25 by changing the angle of the swash plate 25a. For example, the displacement control device 25b includes a piston and a valve. The piston is connected to the swash plate 25a. The valve controls the hydraulic pressure to the piston.

The steering cylinders 26 and 27 are hydraulic cylinders. The steering cylinders 26 and 27 include a left steering cylinder 26 and a right steering cylinder 27. The left steering cylinder 26 is disposed leftward of the pivot joint 13. One end of the left steering cylinder 26 is attached to the front frame 11 and the other end is attached to the rear frame 12. The right steering cylinder 27 is disposed rightward of the pivot joint 13. One end of the right steering cylinder 27 is attached to the front frame 11 and the other end is attached to the rear frame 12.

Figure 3:
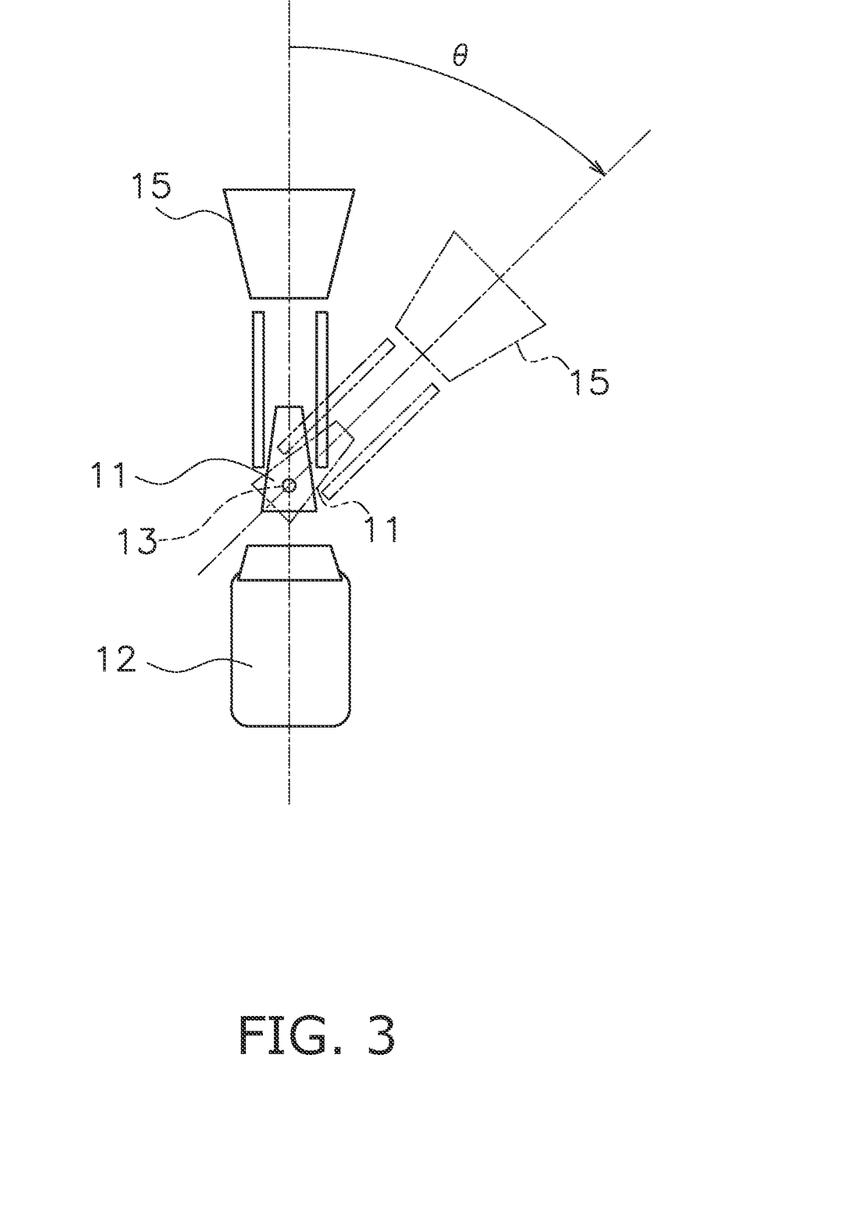
FIG. 3 is a diagram illustrating the articulate angle of the work machine.

The steering cylinders 26 and 27 expand and contract whereby the articulate angle of the work machine 1 changes. As illustrated in FIG. 3, an articulate angle $\theta$ is the angle between the front frame 11 and the rear frame 12. The traveling direction of the work machine 1 is changed by changing the articulate angle.

The cylinder chamber of the left steering cylinder 26 is divided by a piston into an extension chamber 26a and a contraction chamber 26b. When hydraulic fluid is supplied to the extension chamber 26a, the piston moves and the left steering cylinder 26 extends, and when hydraulic fluid is supplied to the contraction chamber 26b, the piston moves and the left steering cylinder 26 contracts.

The cylinder chamber of the right steering cylinder 27 is divided by a piston into an extension chamber 27a and a contraction chamber 27b. When hydraulic fluid is supplied to the extension chamber 27a, the piston moves and the right steering cylinder 27 extends, and when hydraulic fluid is supplied to the contraction chamber 27b, the piston moves and the right steering cylinder 27 contracts.

When the left steering cylinder 26 extends and the right steering cylinder 27 contracts, the front frame 11 bends clockwise with respect to the rear frame 12 and the articulate angle is changed. Consequently, the work machine 1 bends to the right (see R in FIG. 2). When the left steering cylinder 26 contracts and the right steering cylinder 27 extends, the front frame 11 bends counterclockwise with respect to the rear frame 12 and the articulate angle is changed. Consequently, the work machine 1 bends to the left (see L in FIG. 2).

The steering operating member 28 is disposed in the cab 5. The steering operating member 28 is, for example, a steering lever. However, the steering operating member 28 may be another member, such as a steering wheel or a switch. The steering operating member 28 is operable by an operator. The steering operating member 28 is rotatable about a center axis of the steering operating member 28. The steering operating member 28 is rotatable to the left and right from a neutral position. The steering operating member 28 is connected to an input shaft 28a.

The input shaft 28a is connected to the steering valve 29. The steering valve 29 supplies hydraulic fluid to the steering cylinders 26 and 27 in accordance with an operation of the steering operating member 28. The steering valve 29 is, for example, a hydraulic pilot type of valve. The steering valve 29 is controlled by changing the pilot hydraulic pressure to the steering valve 29 in response to the operation of the steering operating member 28. Alternatively, the steering valve 29 may be a solenoid valve that is controlled electrically.

The steering valve 29 has ports P1 to P4. The port P1 is connected to the steering pump 25 through a pipe 31. The hydraulic fluid discharged from the steering pump 25 is supplied to the steering valve 29 through the pipe 31. The port P2 is connected to a tank 30 through a pipe 32. The tank 30 stores hydraulic fluid. The hydraulic fluid drained from the steering cylinders 26 and 27 is drained from the port P2 to the tank 30.

The port P3 is connected to a first supply path 33. The first supply path 33 is connected to the extension chamber 26a of the left steering cylinder 26 and the contraction chamber 27b of the right steering cylinder 27. The port P4 is connected to a second supply path 34. The second supply path 34 is connected to the contraction chamber 26b of the left steering cylinder 26 and the extension chamber 27a of the right steering cylinder 27.

The steering valve 29 switches the connections to the ports P1 to P4 in accordance with the operating direction of the steering operating member 28. The steering valve 29 changes the valve opening degree of the steering valve 29 in accordance with the operating amount of the steering operating member 28. The operating amount of the steering operating member 28 is the operating angle from the neutral position of the steering operating member 28.

When the steering operating member 28 is positioned in the neutral position, the steering valve 29 closes the ports P1 to P4. When the steering operating member 28 is rotated to the right, the steering valve 29 connects the port P1 and the port P3 and connects the port P2 and the port P4. Consequently, hydraulic fluid discharged from the steering pump 25 is supplied through the pipe 31 and the first supply path 33 to the extension chamber 26a and the contraction chamber 27b. Moreover, the hydraulic fluid in the contraction chamber 26b and the extension chamber 27a is drained to the tank 30 through the second supply path 34 and the pipe 32. Consequently, the front frame 11 turns around the pivot joint 13 to the right with respect to the rear frame 12.

When the steering operating member 28 is rotated to the left, the steering valve 29 connects the port P1 and the port P4 and connects the port P2 and the port P3. Consequently, hydraulic fluid discharged from the steering pump 25 is supplied through the pipe 31 and the second supply path 34 to the contraction chamber 26b and the extension chamber 27a. Moreover, the hydraulic fluid in the extension chamber 26a and the contraction chamber 27b is drained to the tank 30 through the first supply path 33 and the pipe 32. Consequently, the front frame 11 turns around the pivot joint 13 to the left with respect to the rear frame 12.

The work machine 1 includes a controller 40. The controller 40 controls travel of the work machine 1 and work by the work implement 3. The controller 40 includes a processor 40a and a storage device 40b. The processor 40a may be, for example, a central processing unit (CPU). Alternatively, the processor may be a processor different from a CPU. The processor 40a executes processing for controlling the work machine 1 in accordance with a program.

The storage device 40b includes a non-volatile memory, such as a read-only memory (ROM), and a volatile memory, such as a random access memory (RAM). The storage device 40b may include an auxiliary storage device, such as a hard disk or a solid state drive (SSD). The storage device 40b is an example of a non-transitory computer-readable recording medium. The storage device 40b stores programs and data for controlling the work machine 1.

The work machine 1 includes an accelerator operating member 41, an accelerator operation sensor 42, and an engine rotation speed sensor 43. The accelerator operating member 41 is operable by the operator. The accelerator operating member is disposed in the cab 5. The accelerator operating member 41 is, for example, a pedal. However, the accelerator operating member 41 may be another member, such as a lever or a switch.

The accelerator operation sensor 42 detects an operating amount (referred to below as "accelerator operating amount") of the accelerator operating member 41. The accelerator operation sensor 42 outputs an accelerator command signal that indicates the accelerator operating amount. The accelerator command signal is input to the controller 40. The engine rotation speed sensor 43 detects the rotation speed of the engine 20. The engine rotation speed sensor 43 outputs an engine rotation speed signal that indicates the rotation speed of the engine 20. The engine rotation speed signal is input to the controller 40.

The controller 40 controls the output of the engine 20 and the transmission 21 in accordance with the accelerator command signal. Consequently, the work machine 1 travels at a speed corresponding to the accelerator operating amount. For example, the controller 40 determines a target engine rotation speed that corresponds to the accelerator operating amount. The controller 40 determines a throttle command to the engine 20 so that the actual engine rotation speed indicated by the engine rotation speed signal matches the target engine rotation speed. The controller 40 controls a fuel injection amount of the engine 20 in response to the throttle command. Alternatively, the controller 40 may determine a target tractive force that corresponds to the accelerator operating amount. The controller 40 may determine the throttle command to the engine 20 so that the target tractive force is achieved.

The work machine 1 includes a work operating member 44 and a work operation sensor 45. The work operating member 44 is operable by the operator. The work operating member 44 is disposed in the cab 5. The work operating member 44 is, for example, a lever. However, the work operating member 44 may be another member, such as a switch. The work operation sensor 45 detects the operating amount (referred to below as "work operating amount") of the work operating member 44. The work operation sensor 45 outputs a work command signal that indicates the work operating amount. The work command signal is input to the controller 40.

The controller 40 controls the control valve 24 in accordance with the work command signal. The controller 40 controls the flow rate of hydraulic fluid supplied to the lift cylinder 16 and the bucket cylinder 17 by controlling the control valve 24. Consequently, the work implement 3 is operated in accordance with the work operating amount. The control valve 24 may be controlled electrically by the controller 40. Alternatively, the control valve 24 may be controlled with pilot hydraulic pressure from the work operating member 44.

The work machine 1 includes a steering pump pressure sensor 46, articulate angle sensors 47 and 48, and a steering operation sensor 49. The steering pump pressure sensor 46 detects the discharge pressure of the steering pump 25. The steering pump pressure sensor 46 outputs a pump pressure signal that indicates the discharge pressure of the steering pump 25. The pump pressure signal is input to the controller 40.

The articulate angle sensors 47 and 48 detect articulate angles. The articulate angle sensors 47 and 48 output articulate angle signals that indicate the articulate angles. The articulate angle signals are input to the controller 40. The articulate angle sensors 47 and 48 are potentiometers, for example, and detect the articulate angles directly. Alternatively, the articulate angle sensor 47 may detect the stroke length of the left steering cylinder 26. The articulate angle sensor 48 may detect the stroke length of the right steering cylinder 27. The controller 40 may calculate the articulate angle from the stroke lengths of the steering cylinders 26 and 27.

The steering operation sensor 49 detects an operating amount (referred to below as "steering operating amount") of the steering operating member 28. The steering operation sensor 49 outputs a steering command signal that corresponds to the steering operating amount. The steering operation sensor 49 is, for example, a potentiometer. The steering command signal is input to the controller 40. The controller 40 acquires the operating direction and the steering operating amount of the steering operating member 28 from the steering command signal.

The displacement control device 25b controls the displacement of the steering pump 25 in accordance with the pressure differential between the load pressure of hydraulic fluid to the steering pump 25 and the discharge pressure of the steering pump 25. Alternatively, the controller 40 may control the displacement of the steering pump 25 by controlling the displacement control device 25b in accordance with the steering operating amount.

Figure 4:
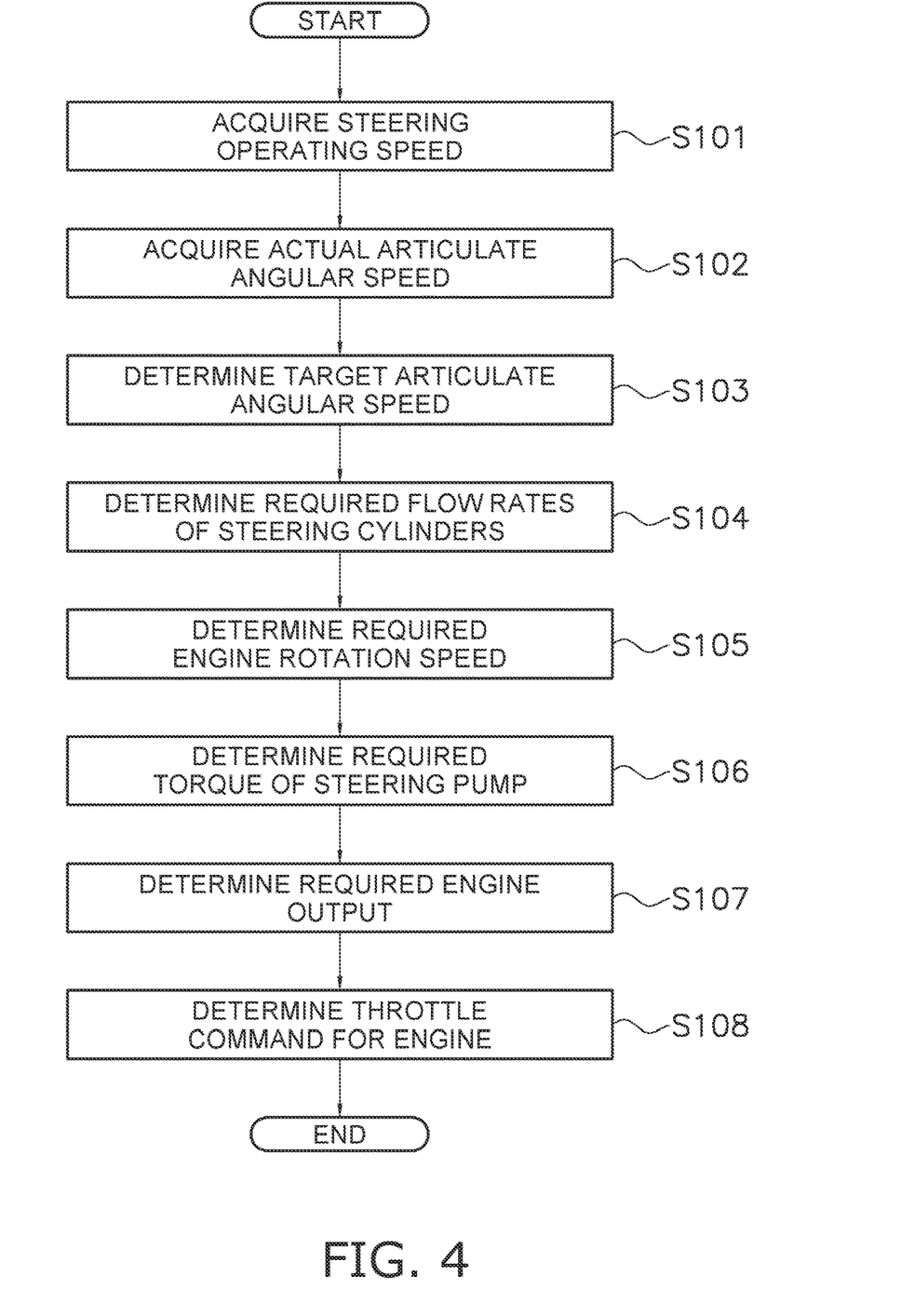
FIG. 4 is a flow chart illustrating processing executed by a controller.

The controller 40 controls the flow rate of hydraulic fluid supplied from the steering pump 25 to the steering cylinders 26 and 27 by controlling the rotation speed of the engine 20 in accordance with the articulate angle signals and the steering command signal during a steering operation. The control of the engine 20 during a steering operation will be explained below. FIG. 4 is a flow chart illustrating processing executed by the controller 40.

In step S101 as illustrated in FIG. 4, the controller 40 acquires the steering operating speed. The steering operating speed is the operating speed of the steering operating member 28. The steering operating speed is represented by the angular speed of the steering operating member 28. The controller 40 calculates the angular speed of the steering operating member 28 from the steering command signal.

In step S102, the controller 40 acquires the actual articulate angular speed. The controller 40 calculates the actual articulate angular speed from the articulate command signals.

Figure 5:
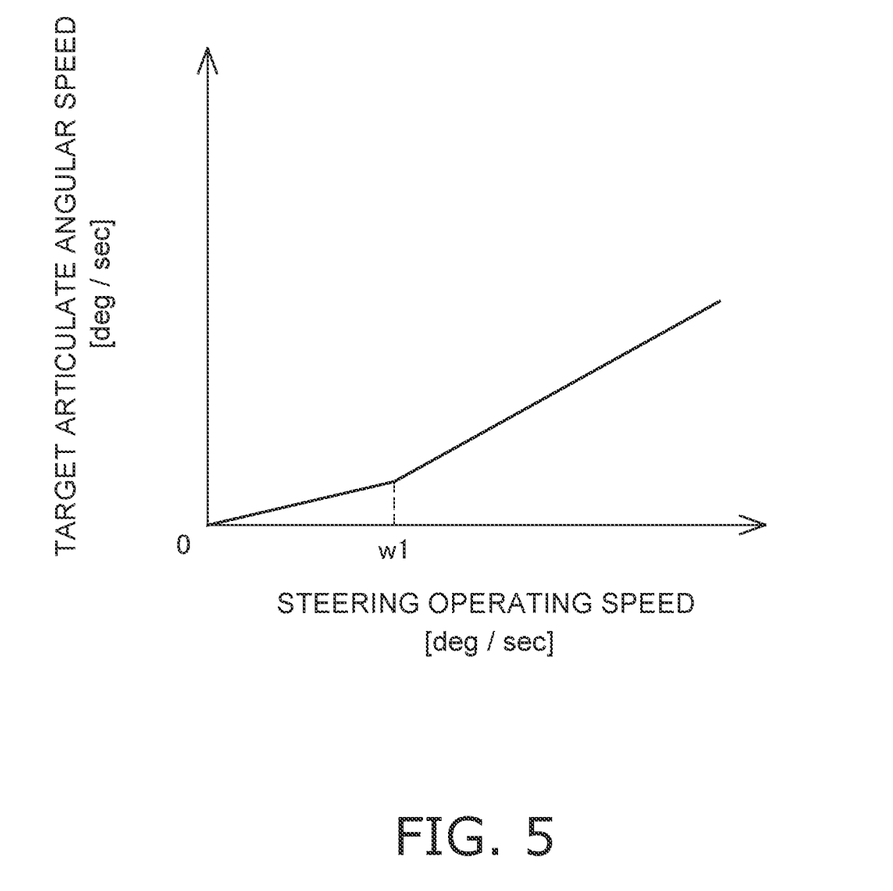
FIG. 5 is a diagram illustrating an example of target articulate data.

In step S103, the controller 40 determines a target articulate angular speed. The controller 40 refers to target articulate data and determines the target articulate angular speed from the steering operating speed. FIG. 5 is a diagram illustrating an example of the target articulate data. The target articulate data defines the relationship between the steering operating speed and the target articulate angular speed. The target articulate data is saved in the storage device 40b.

As illustrated in FIG. 5, the target articulate data defines the target articulate angular speed that increases in accordance with an increase in the steering operating speed. The rate of change of the target articulate angular speed when the steering operating speed is equal to or greater than a predetermined value w1, is greater than the rate of change of the target articulate angular speed when the steering operating speed is less than the predetermined value w1.

The controller 40 corrects the target articulate angular speed with feedback control from the target articulate angular speed determined from the steering operating speed and the actual articulate angular speed. For example, the controller 40 increases the target articulate angular speed so as to reduce a delay of the bending motion of the work machine 1 when the actual bending motion of the work machine 1 is delayed in comparison to the target articulate angular speed.

Figure 6:
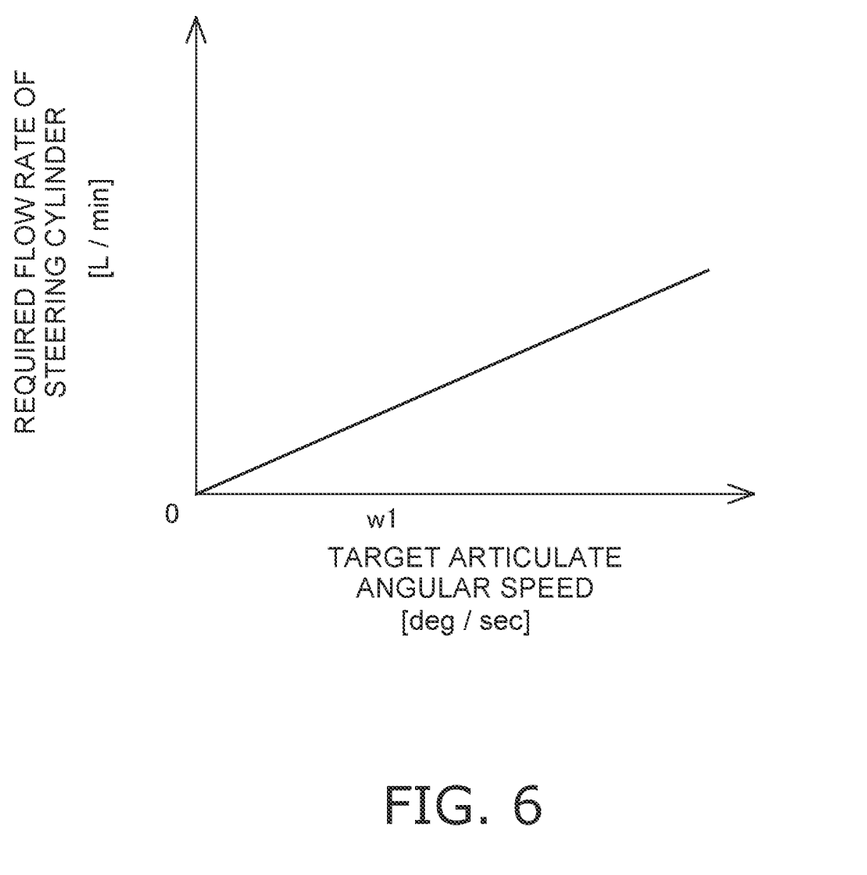
FIG. 6 is a diagram illustrating an example of required flow rate data.

In step S104, the controller 40 determines the required flow rates of the steering cylinders 26 and 27. The controller 40 refers to required flow rate data and determines the required flow rates of the steering cylinders 26 and 27 from the target articulate angular speed. FIG. 6 is a diagram illustrating an example of required flow rate data. The required flow rate data defines the relationship between the target articulate angular speed and the required flow rates of the steering cylinders 26 and 27. The required flow rate data is saved in the storage device 40b. As illustrated in FIG. 6, the required flow rate data defines the required flow rates of the steering cylinders 26 and 27 that increase in accordance with an increase in the target articulate angular speed.

In step S105, the controller 40 determines a required engine rotation speed. The controller 40 calculates the required engine rotation speed from the required flow rates of the steering cylinders 26 and 27. For example, the controller 40 calculates the required engine rotation speed using the following equation (1).

$$Nd = \frac{Qd \times 1000}{Qa \times Ev} \tag{1}$$

Nd is the required engine rotation speed (rpm). Qd is the required flow rate (L/min) of each of the steering cylinders 26 and 27. Qa is the maximum displacement (cc/rev) of the steering pump 25. Ev is the volume efficiency of the steering pump 25.

In step S106, the controller 40 determines the required torque of the steering pump 25. The controller 40 calculates the required torque of the steering pump 25 from the discharge pressure of the steering pump 25 and the required flow rate of each of the steering cylinders 26 and 27. For example, the controller 40 calculates the required torque of the steering pump 25 with the following equations (2) and (3).

$$Td = \frac{qd \times P}{2\pi} \times \frac{1}{Et} \tag{2}$$

$$qd = \frac{Qd \times 1000}{Na \times Ev} \tag{3}$$

Td is the required torque (Nm) of the steering pump 25. P is the discharge pressure (Mpa) of the steering pump 25. qd is the required displacement (cc/rev) of the steering pump 25. Na is the actual engine rotation speed.

In step S107, the controller 40 determines a required engine output. The controller 40 calculates the required engine output from the required torque of the steering pump 25 and the required engine rotation speed. The controller 40 calculates the required engine output using the following equation (4).

$$W = \frac{2\pi \times Td \times Nd}{60 \times 1000} \quad (4)$$

W is the required engine output (kW). The required engine output in this case is the required output of the engine 20 for achieving the above required flow rate in the steering cylinders 26 and 27 and for achieving the above required torque in the steering pump 25.

In step S108, the controller 40 determines the throttle command for the engine 20. The controller 40 determines the throttle command for the engine 20 based on the actual engine rotation speed, the surplus ratio of the output of the engine 20, and the required engine output determined in step S107.

For example, when the output of the engine 20 based on the current throttle command is insufficient with respect to the required engine output determined in step S107, the controller 40 increases the throttle command for the engine 20 in comparison to the current throttle command in consideration of the required engine output determined in step S107. The current throttle command is determined, for example, in accordance with the accelerator operating amount. Alternatively, the current throttle command may be determined in accordance with the accelerator operating amount and the operating amount of the work implement 3. When the output of the engine 20 based on the current throttle command sufficiently covers the required engine output determined in step S107, the controller 40 maintains the current throttle command.

In the work machine 1 according to the embodiment discussed above, the rotation speed of the engine 20 is controlled in accordance with the steering command signal corresponding to the operation of the steering operating member 28. As a result, the flow rate of hydraulic fluid supplied from the steering pump 25 to the steering cylinders 26 and 27 is controlled in accordance with the operation of the steering operating member 28. Consequently, the followability of the bending motion of the work machine 1 with respect to a steering operation can be improved. In addition, fuel consumption can be improved because hydraulic fluid can be supplied to the steering cylinders 26 and 27 at a flow rate that is required in accordance with the steering operation.

The controller 40 controls the rotation speed of the engine 20 in accordance with the steering operating speed. If the steering operating speed is high, the required flow rates of the steering cylinders are increased and the required engine rotation speed is also increased. Consequently, the followability of the bending motion of the work machine 1 with respect to a steering operation can be improved.

The controller 40 determines the required torque of the steering pump 25 based on the discharge pressure of the steering pump 25 and the required flow rates of the steering cylinders 26 and 27. The controller 40 then determines the required engine output based on the required torque and the required engine rotation speed. Consequently, the driving torque of the steering pump 25 required for the bending motion in accordance with the operation of the steering operating member 28 can be assured.

The controller 40 increases the rotation speed of the engine 20 when the actual articulate angular speed is slower than the target articulate angular speed. Consequently, the followability of a bending motion of the work machine 1 with respect to a steering operation can be improved.

Although an embodiment of the present invention has been described so far, the present invention is not limited to the above embodiment and various modifications may be made within the scope of the invention.

The work machine 1 is not limited to a wheel loader and may be another machine such as an articulated dump truck or motor grader, etc. The configuration of the work machine 1 is not limited to the above embodiment and may be modified. For example, the work machine 1 is not limited to tires and may travel using another travel device, such as crawler belts. The configuration of the work implement 3 is not limited to the above embodiment and may be modified.

The structure for the bending motion of the work machine 1, such as the pivot joint 13 and the steering cylinders 26 and 27, may be changed. The work machine 1 may be remotely operated. In this case, the accelerator operating member 41, the work operating member 44, and the steering operating member 28 may be disposed outside of the work machine 1. The controller 40 may also be configured by a plurality of controllers.

The processing executed by the controller 40 may be distributed and executed among the plurality of controllers 40. The processing by the controller 40 is not limited to that of the above embodiment and may be changed. For example, the controller 40 may determine the throttle command for the engine 20 from a total of the required engine output corresponding to the operation of the steering operating member 28, the required engine output corresponding to the operation of the accelerator operating member 41, and the required engine output corresponding to the operation of the work operating member 44.

In the present embodiment, the steering valve 29 changes the valve opening degree of the steering valve 29 in accordance with the operating amount of the steering operating member 28. However, the valve opening degree may be determined based on deviation between the target articulate angle and the actual articulate angle. In this case, the ports P1 to P4 may be closed when target articulate angle and the actual articulate angle match.

According to the present disclosure, the followability of the bending motion of the work machine with respect to a steering operation can be improved and fuel consumption can be improved.

The invention claimed is:
1. A work machine comprising:
a first frame;
a second frame rotatably connected to the first frame;
a steering cylinder connected to the second frame and the first frame and configured to turn the second frame with respect to the first frame;
a hydraulic pump configured to supply hydraulic fluid to the steering cylinder;
an engine configured to drive the hydraulic pump;
a steering operating member configured to be operable by an operator;
a steering operation sensor configured to output a steering command signal corresponding to an operation of the steering operating member;
a controller configured to control a flow rate of hydraulic fluid supplied from the hydraulic pump to the steering cylinder by controlling a rotation speed of the engine in accordance with the steering command signal; and an angle sensor configured to output an articulate angle signal that indicates an articulate angle between the second frame and the first frame, the controller being further configured to
determine a target articulate angular speed based on the steering command signal,
acquire an actual articulate angular speed based on the articulate angle signal, and
increase the rotation speed of the engine when the actual articulate angular speed is slower than the target articulate angular speed.

2. The work machine according to claim 1, wherein the controller is further configured to
acquire an operating speed of the steering operating member from the steering command signal, and
control the rotation speed of the engine in accordance with the operating speed.

3. The work machine according to claim 2, wherein the controller is further configured to increase the rotation speed of the engine in accordance with an increase in the operating speed.

4. The work machine according to claim 3, wherein the controller is further configured to
determine a required flow rate of the steering cylinder based on the steering command signal,
determine a required engine rotation speed based on the required flow rate, and
control the rotation speed of the engine in accordance with the required engine rotation speed.

5. The work machine according to claim 4, further comprising
a pressure sensor configured to detect a discharge pressure of the hydraulic pump,
the controller being further configured to
acquire the discharge pressure,
determine a required torque of the hydraulic pump based on the discharge pressure and the steering command signal,
determine a required engine output based on the required torque and the required engine rotation speed, and
control the engine in accordance with the required engine output.

6. The work machine according to claim 1, wherein the controller is further configured to
determine a required flow rate of the steering cylinder based on the steering command signal,
determine a required engine rotation speed based on the required flow rate, and
control the rotation speed of the engine in accordance with the required engine rotation speed.

7. The work machine according to claim 6, further comprising
a pressure sensor configured to detect a discharge pressure of the hydraulic pump,
the controller being further configured to
acquire the discharge pressure,
determine a required torque of the hydraulic pump based on the discharge pressure and the steering command signal,
determine a required engine output based on the required torque and the required engine rotation speed, and
control the engine in accordance with the required engine output.

8. The work machine according to claim 1, wherein the work machine is a wheel loader, and
the second frame is disposed in front of the first frame, and
the work machine further includes
a work implement attached to the second frame,
a rear tire attached to the first frame, and
a front tire attached to the second frame.

9. A method for controlling a work machine including a first frame, a second frame rotatably connected to the first frame, a steering cylinder connected to the first frame and the second frame and causing the second frame to turn with respect to the first frame, a hydraulic pump that supplies hydraulic fluid to the steering cylinder, and an engine that drives the hydraulic pump, the method comprising:
acquiring a steering command signal corresponding to a steering operating member configured to be operable by an operator;
controlling a flow rate of hydraulic fluid supplied from the hydraulic pump to the steering cylinder by controlling a rotation speed of the engine in accordance with the steering command signal;
acquiring an articulate angle signal that indicates an articulate angle between the second frame and the first frame;
determining a target articulate angular speed based on the steering command signal;
acquiring an actual articulate angular speed based on the articulate angle signal; and
increasing the rotation speed of the engine when the actual articulate angular speed is slower than the target articulate angular speed.

10. The method according to claim 9, further comprising
acquiring an operating speed of the steering operating member from the steering command signal, and
controlling the rotation speed of the engine in accordance with the operating speed.

11. The method according to claim 10, further comprising
increasing the rotation speed of the engine in accordance with an increase in the operating speed.

12. The method according to claim 11, further comprising
determining a required flow rate of the steering cylinder based on the steering command signal;
determining a required engine rotation speed based on the required flow rate; and
controlling the rotation speed of the engine in accordance with the required engine rotation speed.

13. The method according to claim 12, further comprising
acquiring a discharge pressure of the hydraulic pump;
determining a required torque of the hydraulic pump based on the discharge pressure and the steering command signal;
determining a required engine output based on the required torque and the required engine rotation speed; and
controlling the engine in accordance with the required engine output.

14. The method according to claim 9, further comprising
determining a required flow rate of the steering cylinder based on the steering command signal;
determining a required engine rotation speed based on the required flow rate; and
controlling the rotation speed of the engine in accordance with the required engine rotation speed.

15. The method according to claim 14, further comprising
acquiring a discharge pressure of the hydraulic pump;
determining a required torque of the hydraulic pump based on the discharge pressure and the steering command signal;

determining a required engine output based on the required torque and the required engine rotation speed; and controlling the engine in accordance with the required engine output.

16. The work machine according to claim 5, wherein the work machine is a wheel loader, and the second frame is disposed in front of the first frame, the work machine further including
- a work implement attached to the second frame,
- a rear tire attached to the first frame, and
- a front tire attached to the second frame.

* * * * *